(12) United States Patent
Kylander et al.

(10) Patent No.: US 6,369,470 B1
(45) Date of Patent: *Apr. 9, 2002

(54) AXIAL COOLING OF A ROTOR

(75) Inventors: Gunnar Kylander; Mats Leijon, both of Vasteras (SE)

(73) Assignee: ABB AB, Vasteras (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/297,609

(22) PCT Filed: Nov. 4, 1997

(86) PCT No.: PCT/SE97/01841

§ 371 Date: Jun. 28, 1999

§ 102(e) Date: Jun. 28, 1999

(87) PCT Pub. No.: WO98/20600

PCT Pub. Date: May 14, 1998

(30) Foreign Application Priority Data

Nov. 4, 1996 (SE) .................................. 9604027

(51) Int. Cl.[7] .............................................. H02K 9/00
(52) U.S. Cl. .......................................... 310/52; 310/61
(58) Field of Search ............................ 310/52, 58, 61, 310/62, 269; 174/DIG. 13–DIG. 33

(56) References Cited

U.S. PATENT DOCUMENTS

| | | |
|---|---|---|
| 681,800 A | 9/1901 | Lasche |
| 847,008 A | 3/1907 | Kitsee |
| 1,304,451 A | 5/1919 | Burnham |
| 1,418,856 A | 6/1922 | Williamson |
| 1,481,585 A | 1/1924 | Beard |
| 1,508,456 A | 9/1924 | Lenz |

(List continued on next page.)

FOREIGN PATENT DOCUMENTS

| | | |
|---|---|---|
| AT | 399790 | 7/1995 |
| BE | 565063 | 2/1957 |
| CH | 391071 | 4/1965 |
| CH | 266037 | 10/1965 |
| CH | 534448 | 2/1973 |
| CH | 539328 | 7/1973 |
| CH | 646403 | 2/1979 |
| CH | 657482 | 8/1986 |

(List continued on next page.)

OTHER PUBLICATIONS

Shipboard Electrical Insulation; G. L. Moses, 1951, pp 2&3.
ABB Elkrafthandbok; ABB AB; ; pp 274–276.
Elkraft teknisk Handbok, 2 Elmaskiner; A. Alfredsson et al; 1988, pp 121–123.
High Voltage Cables in a New Class of Generators Powerformer; M. Leijon et al; Jun. 14, 1999; pp 1–8.
Ohne Tranformator direkt ins Netz; Owman et al, ABB, AB; Feb. 8, 1999; pp 48–51.

(List continued on next page.)

Primary Examiner—Joseph Waks
(74) Attorney, Agent, or Firm—Dykema Gossett PLLC (57) ABSTRACT

A rotating electric machine (1) having a stator (2) provided with windings and a rotor (4) provided with field windings and with salient poles (10) forming pole gaps (9) between the pole shoes (12) of the poles (10), which rotor (4) is arranged to be cooled by air flowing axially through the pole gaps (9) of the rotor (4), wherein each pole gap (9) between the pole shoes (12) is covered by at least one covering member (14) and that the air gap (15) is equipped with a sealing ring (16) to limit axial air flow.

8 Claims, 1 Drawing Sheet

U.S. PATENT DOCUMENTS

| | | |
|---|---|---|
| 1,728,915 A | 9/1929 | Blankenship et al. |
| 1,742,985 A | 1/1930 | Burnham |
| 1,747,507 A | 2/1930 | George |
| 1,756,672 A | 4/1930 | Barr |
| 1,762,775 A | 6/1930 | Ganz |
| 1,781,308 A | 11/1930 | Vos |
| 1,861,182 A | 5/1932 | Hendley et al. |
| 1,904,885 A | 4/1933 | Seeley |
| 1,974,406 A | 9/1934 | Apple et al. |
| 2,006,170 A | 6/1935 | Juhlin |
| 2,206,856 A | 7/1940 | Shearer |
| 2,217,430 A | 10/1940 | Baudry |
| 2,241,832 A | 5/1941 | Wahlquist |
| 2,251,291 A | 8/1941 | Reichelt |
| 2,256,897 A | 9/1941 | Davidson et al. |
| 2,295,415 A | 9/1942 | Monroe |
| 2,409,893 A | 10/1946 | Pendleton et al. |
| 2,415,652 A | 2/1947 | Norton |
| 2,424,443 A | 7/1947 | Evans |
| 2,436,306 A | 2/1948 | Johnson |
| 2,446,999 A | 8/1948 | Camilli |
| 2,459,322 A | 1/1949 | Johnston |
| 2,462,651 A | 2/1949 | Lord |
| 2,498,238 A | 2/1950 | Berberich et al. |
| 2,650,350 A | 8/1953 | Heath |
| 2,721,905 A | 10/1955 | Monroe |
| 2,749,456 A | 6/1956 | Luenberger |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschl et al. |
| 2,947,957 A | 8/1960 | Spindler |
| 2,959,699 A | 11/1960 | Smith et al. |
| 2,962,679 A | 11/1960 | Stratton |
| 2,975,309 A | 3/1961 | Seidner |
| 3,014,139 A | 12/1961 | Shildneck |
| 3,098,893 A | 7/1963 | Pringle et al. |
| 3,130,335 A | 4/1964 | Rejda |
| 3,143,269 A | 8/1964 | Eldik |
| 3,157,806 A | 11/1964 | Wiedemann |
| 3,158,770 A | 11/1964 | Coggeshall et al. |
| 3,197,723 A | 7/1965 | Dortort |
| 3,268,766 A | 8/1966 | Amos |
| 3,304,599 A | 2/1967 | Nordin |
| 3,354,331 A | 11/1967 | Broeker et al. |
| 3,365,657 A | 1/1968 | Webb |
| 3,372,283 A | 3/1968 | Jaecklin |
| 3,392,779 A | 7/1968 | Tilbrook |
| 3,411,027 A | 11/1968 | Rosenberg |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,541,221 A | 11/1970 | Aupoix et al. |
| 3,560,777 A | 2/1971 | Moeller |
| 3,571,690 A | 3/1971 | Lataisa |
| 3,588,557 A * | 6/1971 | Kilgore ...................... 310/269 |
| 3,593,123 A | 7/1971 | Williamson |
| 3,631,519 A | 12/1971 | Salahshourian |
| 3,644,662 A | 2/1972 | Salahshourian |
| 3,651,244 A | 3/1972 | Silver et al. |
| 3,651,402 A | 3/1972 | Leffmann |
| 3,660,721 A | 5/1972 | Baird |
| 3,666,876 A | 5/1972 | Forster |
| 3,670,192 A | 6/1972 | Andersson et al. |
| 3,675,056 A | 7/1972 | Lenz |
| 3,684,821 A | 8/1972 | Miyauchi et al. |
| 3,684,906 A | 8/1972 | Lexz |
| 3,699,238 A | 10/1972 | Hansen et al. |
| 3,716,652 A | 2/1973 | Lusk et al. |
| 3,716,719 A | 2/1973 | Angelery et al. |
| 3,727,085 A | 4/1973 | Goetz et al. |
| 3,740,600 A | 6/1973 | Turley |
| 3,743,867 A | 7/1973 | Smith, Jr. |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,787,607 A | 1/1974 | Schlafly |
| 3,792,399 A | 2/1974 | McLyman |
| 3,801,843 A | 4/1974 | Corman et al. |
| 3,809,933 A | 5/1974 | Sugawara et al. |
| 3,813,764 A | 6/1974 | Tanaka et al. |
| 3,828,115 A | 8/1974 | Hvizd, Jr. |
| 3,881,647 A | 5/1975 | Wolfe |
| 3,884,154 A | 5/1975 | Marten |
| 3,891,880 A | 6/1975 | Britsch |
| 3,902,000 A | 8/1975 | Forsyth et al. |
| 3,912,957 A | 10/1975 | Reynolds |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs |
| 3,993,860 A | 11/1976 | Snow et al. |
| 3,995,785 A | 12/1976 | Arick et al. |
| 4,001,616 A | 1/1977 | Lonseth et al. |
| 4,008,367 A | 2/1977 | Sunderhauf |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A | 5/1978 | Quirk |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. |
| 4,109,098 A | 8/1978 | Olsson et al. |
| 4,121,148 A | 10/1978 | Platzer |
| 4,132,914 A | 1/1979 | Khutoretsky |
| 4,134,036 A | 1/1979 | Curtiss |
| 4,134,055 A | 1/1979 | Akamatsu |
| 4,134,146 A | 1/1979 | Stetson |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. |
| 4,208,597 A | 6/1980 | Mulach et al. |
| 4,229,721 A | 10/1980 | Koloczek et al. |
| 4,238,339 A | 12/1980 | Khutoretsky et al. |
| 4,239,999 A | 12/1980 | Vinokurov et al. |

| | | | | | | |
|---|---|---|---|---|---|---|
| 4,245,182 A | | 1/1981 | Aotsu et al. | 4,594,630 A | 6/1986 | Rabinowitz et al. |
| 4,246,694 A | | 1/1981 | Raschbichler et al. | 4,607,183 A | 8/1986 | Rieber et al. |
| 4,255,684 A | | 3/1981 | Mischler et al. | 4,615,109 A | 10/1986 | Wcislo et al. |
| 4,258,280 A | | 3/1981 | Starcevic | 4,615,778 A | 10/1986 | Elton |
| 4,262,209 A | | 4/1981 | Berner | 4,618,795 A | 10/1986 | Cooper et al. |
| 4,274,027 A | | 6/1981 | Higuchi et al. | 4,619,040 A | 10/1986 | Wang et al. |
| 4,281,264 A | | 7/1981 | Keim et al. | 4,622,116 A | 11/1986 | Elton et al. |
| 4,307,311 A | | 12/1981 | Grozinger | 4,633,109 A | 12/1986 | Feigel |
| 4,308,476 A | | 12/1981 | Schuler | 4,650,924 A | 3/1987 | Kauffman et al. |
| 4,308,575 A | | 12/1981 | Mase | 4,652,963 A | 3/1987 | Fahlen |
| 4,310,966 A | | 1/1982 | Brietenbach | 4,656,379 A | 4/1987 | McCarty |
| 4,314,168 A | | 2/1982 | Breitenbach | 4,677,328 A | 6/1987 | Kumakura |
| 4,317,001 A | | 2/1982 | Silver et al. | 4,687,882 A | 8/1987 | Stone et al. |
| 4,320,645 A | | 3/1982 | Stanley | 4,692,731 A | 9/1987 | Osinga |
| 4,321,426 A | | 3/1982 | Schaeffer | 4,723,083 A | 2/1988 | Elton |
| 4,321,518 A | | 3/1982 | Akamatsu | 4,723,104 A | 2/1988 | Rohatyn |
| 4,330,726 A | | 5/1982 | Albright et al. | 4,724,345 A | 2/1988 | Elton et al. |
| 4,337,922 A | | 7/1982 | Streiff et al. | 4,732,412 A | 3/1988 | van der Linden et al. |
| 4,341,989 A | | 7/1982 | Sandberg et al. | 4,737,704 A | 4/1988 | Kalinnikov et al. |
| 4,347,449 A | | 8/1982 | Beau | 4,745,314 A | 5/1988 | Nakano |
| 4,347,454 A | | 8/1982 | Gellert et al. | 4,761,602 A | 8/1988 | Leibovich |
| 4,353,612 A | | 10/1982 | Meyers | 4,766,365 A | 8/1988 | Bolduc et al. |
| 4,357,542 A | | 11/1982 | Kirschbaum | 4,771,168 A | 9/1988 | Gundersen et al. |
| 4,360,748 A | | 11/1982 | Raschbichler et al. | 4,785,138 A | 11/1988 | Brietenbach et al. |
| 4,361,723 A | | 11/1982 | Hvizd, Jr. et al. | 4,795,933 A | * 1/1989 | Sakai .................. 310/269 |
| 4,365,178 A | | 12/1982 | Lexz | 4,827,172 A | 5/1989 | Kobayashi |
| 4,367,425 A | | 1/1983 | Mendelsohn et al. | 4,840,538 A | * 6/1989 | Lehoczky ............. 416/96 A |
| 4,367,890 A | | 1/1983 | Spirk | 4,845,308 A | 7/1989 | Womack, Jr. et al. |
| 4,368,418 A | | 1/1983 | Demello et al. | 4,847,747 A | 7/1989 | Abbondanti |
| 4,369,389 A | | 1/1983 | Lambrecht | 4,853,565 A | 8/1989 | Elton et al. |
| 4,371,745 A | | 2/1983 | Sakashita | 4,859,810 A | 8/1989 | Cloetens et al. |
| 4,383,191 A | * | 5/1983 | Mizuyama et al. .......... 310/59 | 4,859,989 A | 8/1989 | McPherson |
| 4,384,944 A | | 5/1983 | Silver et al. | 4,860,430 A | 8/1989 | Raschbichler et al. |
| 4,387,316 A | | 6/1983 | Katsekas | 4,864,266 A | 9/1989 | Feather et al. |
| 4,401,920 A | | 8/1983 | Taylor et al. | 4,883,230 A | 11/1989 | Lindstrom |
| 4,403,163 A | | 9/1983 | Rarmerding et al. | 4,890,040 A | 12/1989 | Gundersen |
| 4,404,486 A | | 9/1983 | Keim et al. | 4,894,284 A | 1/1990 | Yamanouchi et al. |
| 4,411,710 A | | 10/1983 | Mochizuki et al. | 4,914,386 A | 4/1990 | Zocholl |
| 4,421,284 A | | 12/1983 | Pan | 4,918,347 A | 4/1990 | Takaba |
| 4,425,521 A | | 1/1984 | Rosenberry, Jr. et al. | 4,918,835 A | 4/1990 | Wcislo et al. |
| 4,426,771 A | | 1/1984 | Wang et al. | 4,924,342 A | 5/1990 | Lee |
| 4,429,244 A | | 1/1984 | Nikiten et al. | 4,926,079 A | 5/1990 | Niemela et al. |
| 4,431,960 A | | 2/1984 | Zucker | 4,942,326 A | 7/1990 | Butler, III et al. |
| 4,432,029 A | | 2/1984 | Lundqvist | 4,949,001 A | 8/1990 | Campbell |
| 4,437,464 A | | 3/1984 | Crow | 4,982,147 A | 1/1991 | Lauw |
| 4,443,725 A | | 4/1984 | Derderian et al. | 4,994,952 A | 2/1991 | Silva et al. |
| 4,467,229 A | * | 8/1984 | Ogita ...................... 310/60 A | 4,997,995 A | 3/1991 | Simmons et al. |
| 4,470,884 A | | 9/1984 | Carr | 5,012,125 A | 4/1991 | Conway |
| 4,473,765 A | | 9/1984 | Butman, Jr. et al. | 5,030,813 A | 7/1991 | Stanisz |
| 4,475,075 A | | 10/1984 | Munn | 5,036,165 A | 7/1991 | Elton et al. |
| 4,477,690 A | * | 10/1984 | Nikitin et al. ............. 174/15.6 | 5,036,238 A | 7/1991 | Tajima |
| 4,481,438 A | | 11/1984 | Keim | 5,066,881 A | 11/1991 | Elton et al. |
| 4,484,106 A | | 11/1984 | Taylor et al. | 5,067,046 A | 11/1991 | Elton et al. |
| 4,488,079 A | | 12/1984 | Dailey et al. | 5,083,360 A | 1/1992 | Valencic et al. |
| 4,490,651 A | | 12/1984 | Taylor et al. | 5,086,246 A | 2/1992 | Dymond et al. |
| 4,496,863 A | * | 1/1985 | Sawatani .................... 310/61 | 5,091,609 A | 2/1992 | Swada et al. |
| 4,503,284 A | | 3/1985 | Kelleghan | 5,094,703 A | 3/1992 | Takaoka et al. |
| 4,508,251 A | | 4/1985 | Harada et al. | 5,095,175 A | 3/1992 | Yoshida et al. |
| 4,510,077 A | | 4/1985 | Elton | 5,097,241 A | 3/1992 | Smith et al. |
| 4,517,471 A | | 5/1985 | Sachs | 5,097,591 A | 3/1992 | Wcislo et al. |
| 4,520,287 A | | 5/1985 | Wang et al. | 5,111,095 A | 5/1992 | Hendershot |
| 4,523,249 A | | 6/1985 | Arimoto | 5,124,607 A | 6/1992 | Rieber et al. |
| 4,538,131 A | | 8/1985 | Baier et al. | 5,136,459 A | 8/1992 | Fararooy |
| 4,546,210 A | | 10/1985 | Akiba et al. | 5,140,290 A | 8/1992 | Dersch |
| 4,551,780 A | | 11/1985 | Canay | 5,153,460 A | 10/1992 | Bovino et al. |
| 4,557,038 A | | 12/1985 | Wcislo et al. | 5,168,662 A | 12/1992 | Nakamura et al. |
| 4,560,896 A | | 12/1985 | Vogt et al. | 5,171,941 A | 12/1992 | Smimizu et al. |
| 4,565,929 A | | 1/1986 | Baskin et al. | 5,182,537 A | 1/1993 | Thuis |
| 4,571,453 A | | 2/1986 | Takaoka et al. | 5,187,428 A | 2/1993 | Hutchison et al. |
| 4,588,916 A | | 5/1986 | Lis | 5,231,249 A | 7/1993 | Kimura et al. |
| 4,590,416 A | | 5/1986 | Porche et al. | 5,235,488 A | 8/1993 | Koch |

| | | | | | |
|---|---|---|---|---|---|
| 5,246,783 A | 9/1993 | Spenadel et al. | DE | 673545 | 3/1939 |
| 5,264,778 A | 11/1993 | Kimmel et al. | DE | 719009 | 3/1942 |
| 5,287,262 A | 2/1994 | Klein | DE | 846583 | 8/1952 |
| 5,304,883 A | 4/1994 | Denk | DE | 875227 | 4/1953 |
| 5,305,961 A | 4/1994 | Errard et al. | DE | 975999 | 1/1963 |
| 5,321,308 A | 6/1994 | Johncock | DE | 1465719 | 5/1969 |
| 5,323,330 A | 6/1994 | Asplund et al. | DE | 1807391 | 5/1970 |
| 5,325,008 A | 6/1994 | Grant | DE | 2050674 | 5/1971 |
| 5,325,259 A | 6/1994 | Paulsson | DE | 1638176 | 6/1971 |
| 5,327,637 A | 7/1994 | Britenbach et al. | DE | 2155371 | 5/1973 |
| 5,341,281 A | 8/1994 | Skibinski | DE | 2400698 | 7/1975 |
| 5,343,139 A | 8/1994 | Gyugyi et al. | DE | 2520511 | 11/1976 |
| 5,355,046 A | 10/1994 | Weigelt | DE | 2605815 A * | 8/1977 |
| 5,365,132 A | 11/1994 | Hann et al. | DE | 2656389 | 6/1978 |
| 5,387,890 A | 2/1995 | Estop et al. | DE | 2721905 | 11/1978 |
| 5,397,513 A | 3/1995 | Steketee, Jr. | DE | 2824951 | 12/1979 |
| 5,399,941 A | 3/1995 | Grothaus et al. | DE | 2835386 | 2/1980 |
| 5,400,005 A | 3/1995 | Bobry | DE | 2839517 | 3/1980 |
| 5,408,169 A | 4/1995 | Jeanneret | DE | 2854520 | 6/1980 |
| 5,449,861 A | 9/1995 | Fujino et al. | DE | 3009102 | 9/1980 |
| 5,452,170 A | 9/1995 | Ohde et al. | DE | 2913697 | 10/1980 |
| 5,468,916 A | 11/1995 | Litenas et al. | DE | 2920478 | 12/1980 |
| 5,499,178 A | 3/1996 | Mohan | DE | 3028777 | 3/1981 |
| 5,500,632 A | 3/1996 | Halser, III | DE | 2939004 | 4/1981 |
| 5,510,942 A | 4/1996 | Bock et al. | DE | 3006382 | 8/1981 |
| 5,530,307 A | 6/1996 | Horst | DE | 3008818 | 9/1981 |
| 5,533,658 A | 7/1996 | Benedict et al. | DE | 209313 | 4/1984 |
| 5,534,754 A | 7/1996 | Poumey | DE | 3305225 | 8/1984 |
| 5,545,853 A | 8/1996 | Hildreth | DE | 3309051 | 9/1984 |
| 5,550,410 A | 8/1996 | Titus | DE | 3441311 | 5/1986 |
| 5,583,387 A | 12/1996 | Takeuchi et al. | DE | 3543106 | 6/1987 |
| 5,587,126 A | 12/1996 | Steketee, Jr. | DE | 2917717 | 8/1987 |
| 5,598,137 A | 1/1997 | Alber et al. | DE | 3612112 | 10/1987 |
| 5,607,320 A | 3/1997 | Wright | DE | 3726346 | 2/1989 |
| 5,612,510 A | 3/1997 | Hildreth | DE | 3925337 | 2/1991 |
| 5,663,605 A | 9/1997 | Evans et al. | DE | 4023903 | 11/1991 |
| 5,672,926 A | 9/1997 | Brandes et al. | DE | 4022476 | 1/1992 |
| 5,689,223 A | 11/1997 | Demarmels et al. | DE | 4233558 | 3/1994 |
| 5,807,447 A | 9/1998 | Forrest | DE | 4402184 | 8/1995 |
| 5,834,699 A | 11/1998 | Buck et al. | DE | 4409794 | 8/1995 |

FOREIGN PATENT DOCUMENTS

| | | |
|---|---|---|
| DE | 4412761 | 10/1995 |
| DE | 4420322 | 12/1995 |
| CH | 1189322 | 10/1986 |
| DD | 137164 | 8/1979 |
| DE | 19620906 | 1/1996 |
| DD | 138840 | 11/1979 |
| DE | 4438186 | 5/1996 |
| DE | 40414 | 8/1887 |
| DE | 19020222 | 3/1997 |
| DE | 134022 | 12/1901 |
| DE | 19547229 | 6/1997 |
| DE | 277012 | 7/1914 |
| DE | 468827 | 7/1997 |
| DE | 336418 | 5/1921 |
| EP | 049104 | 4/1982 |
| DE | 386561 | 12/1923 |
| EP | 0493704 | 4/1982 |
| DE | 387973 | 1/1924 |
| EP | 078908 | 5/1983 |
| DE | 406371 | 11/1924 |
| EP | 0102513 | 3/1984 |
| DE | 425551 | 2/1926 |
| EP | 0120154 | 10/1984 |
| DE | 426793 | 3/1926 |
| EP | 0130124 | 1/1985 |
| DE | 432169 | 7/1926 |
| EP | 0142813 | 5/1985 |
| DE | 433749 | 9/1926 |
| EP | 0155405 | 9/1985 |
| DE | 435608 | 10/1926 |
| EP | 0102513 | 1/1986 |
| DE | 435609 | 10/1926 |
| EP | 0174783 | 3/1986 |
| DE | 441717 | 3/1927 |
| EP | 0185788 | 7/1986 |
| DE | 443011 | 4/1927 |
| EP | 0277358 | 8/1986 |
| DE | 460124 | 5/1928 |
| EP | 0234521 | 9/1987 |
| DE | 372390 | 3/1929 |
| EP | 0244069 | 11/1987 |
| DE | 482506 | 9/1929 |
| EP | 0246377 | 11/1987 |
| DE | 501181 | 7/1930 |
| EP | 0265868 | 5/1988 |
| DE | 523047 | 4/1931 |
| EP | 0274691 | 7/1988 |
| DE | 568508 | 1/1933 |
| EP | 0280759 | 9/1988 |
| DE | 572030 | 3/1933 |
| EP | 0282876 | 9/1988 |
| DE | 584639 | 9/1933 |
| EP | 0309096 | 3/1989 |
| DE | 586121 | 10/1933 |
| EP | 0314860 | 5/1989 |
| DE | 604972 | 11/1934 |
| EP | 0316911 | 5/1989 |
| DE | 629301 | 4/1936 |
| EP | 0317248 | 5/1989 |
| | | |
| EP | 0335430 | 10/1989 |

| | | | | | | |
|---|---|---|---|---|---|---|
| EP | 0342554 | 11/1989 | | GB | 1053337 | 12/1966 |
| EP | 0221404 | 5/1990 | | GB | 1059123 | 2/1967 |
| EP | 0375101 | 6/1990 | | GB | 1103098 | 2/1968 |
| EP | 0406437 | 1/1991 | | GB | 1103099 | 2/1968 |
| EP | 0439410 | 7/1991 | | GB | 1117401 | 6/1968 |
| EP | 0440865 | 8/1991 | | GB | 1135242 | 12/1968 |
| EP | 0469155 A1 | 2/1992 | | GB | 1147049 | 4/1969 |
| EP | 0490705 | 6/1992 | | GB | 1157885 | 7/1969 |
| EP | 0503817 | 9/1992 | | GB | 1174659 | 12/1969 |
| EP | 0571155 | 11/1993 | | GB | 1236082 | 6/1971 |
| EP | 0620570 | 10/1994 | | GB | 1268770 | 3/1972 |
| EP | 0620630 | 10/1994 | | GB | 1340983 | 12/1973 |
| EP | 0642027 | 3/1995 | | GB | 1341050 | 12/1973 |
| EP | 0671632 | 9/1995 | | GB | 1365191 | 8/1974 |
| EP | 0676777 | 10/1995 | | GB | 1395152 | 5/1975 |
| EP | 0677915 | 10/1995 | | GB | 1424982 | 2/1976 |
| EP | 0684679 | 11/1995 | | GB | 1426594 | 3/1976 |
| EP | 0684682 | 11/1995 | | GB | 1438610 | 6/1976 |
| EP | 0695019 | 1/1996 | | GB | 1445284 | 8/1976 |
| EP | 0732787 | 9/1996 | | GB | 1479904 | 7/1977 |
| EP | 0738034 | 10/1996 | | GB | 1493163 | 11/1977 |
| EP | 0739087 A2 | 10/1996 | | GB | 1502938 | 3/1978 |
| EP | 0740315 | 10/1996 | | GB | 1525745 | 9/1978 |
| EP | 0749190 A2 | 12/1996 | | GB | 2000625 | 1/1979 |
| EP | 0751605 | 1/1997 | | GB | 1548633 | 7/1979 |
| EP | 0739087 A3 | 3/1997 | | GB | 2046142 | 11/1979 |
| EP | 0749193 A3 | 3/1997 | | GB | 2022327 | 12/1979 |
| EP | 0780926 | 6/1997 | | GB | 2025150 | 1/1980 |
| EP | 0802542 | 10/1997 | | GB | 2034175 | 5/1980 |
| EP | 0913912 A1 | 5/1999 | | GB | 1574796 | 9/1980 |
| FR | 805544 | 4/1936 | | GB | 2070470 | 9/1981 |
| FR | 841351 | 1/1938 | | GB | 2071433 | 9/1981 |
| FR | 847899 | 12/1938 | | GB | 2081523 | 2/1982 |
| FR | 916959 | 12/1946 | | GB | 2099635 | 12/1982 |
| FR | 1011924 | 4/1949 | | GB | 2105925 | 3/1983 |
| FR | 1126975 | 3/1955 | | GB | 2106306 | 4/1983 |
| FR | 1238795 | 7/1959 | | GB | 2106721 | 4/1983 |
| FR | 2108171 | 5/1972 | | GB | 2136214 | 9/1984 |
| FR | 2251938 | 6/1975 | | GB | 2140195 | 11/1984 |
| FR | 2305879 | 10/1976 | | GB | 2150153 | 6/1985 |
| FR | 2376542 | 7/1978 | | GB | 2268337 | 1/1994 |
| FR | 2467502 | 4/1981 | | GB | 2273819 | 6/1994 |
| FR | 2481531 | 10/1981 | | GB | 2283133 | 4/1995 |
| FR | 2349228 A * | 5/1982 | | GB | 2289992 | 12/1995 |
| FR | 2556146 | 6/1985 | | GB | 2308490 | 6/1997 |
| FR | 2594271 | 8/1987 | | GB | 2332557 | 6/1999 |
| FR | 2708157 | 1/1995 | | HU | 175494 | 11/1981 |
| GB | 123906 | 3/1919 | | JP | 60206121 | 3/1959 |
| GB | 268271 | 3/1927 | | JP | 57043529 | 8/1980 |
| GB | 293861 | 11/1928 | | JP | 57126117 | 5/1982 |
| GB | 292999 | 4/1929 | | JP | 59076156 | 10/1982 |
| GB | 319313 | 7/1929 | | JP | 59159642 | 2/1983 |
| GB | 518993 | 3/1940 | | JP | 6264964 | 9/1985 |
| GB | 537609 | 6/1941 | | JP | 1129737 | 5/1989 |
| GB | 540456 | 10/1941 | | JP | 62320631 | 6/1989 |
| GB | 589071 | 6/1947 | | JP | 2017474 | 1/1990 |
| GB | 666883 | 2/1952 | | JP | 3245748 | 2/1990 |
| GB | 685416 | 1/1953 | | JP | 4179107 | 11/1990 |
| GB | 702892 | 1/1954 | | JP | 318253 | 1/1991 |
| GB | 715226 | 9/1954 | | JP | 424909 | 1/1992 |
| GB | 723457 | 2/1955 | | JP | 5290947 | 4/1992 |
| GB | 739962 | 11/1955 | | JP | 6196343 | 12/1992 |
| GB | 763761 | 12/1956 | | JP | 6233442 | 2/1993 |
| GB | 805721 | 12/1958 | | JP | 6325629 | 5/1993 |
| GB | 827600 | 2/1960 | | JP | 7057951 | 8/1993 |
| GB | 854728 | 11/1960 | | JP | 7264789 | 3/1994 |
| GB | 870583 | 6/1961 | | JP | 8167332 | 12/1994 |
| GB | 913386 | 12/1962 | | JP | 7161270 | 6/1995 |
| GB | 965741 | 8/1964 | | JP | 8264039 | 11/1995 |
| GB | 992249 | 5/1965 | | JP | 9200989 | 1/1996 |
| GB | 1024583 | 3/1966 | | JP | 8036952 | 2/1996 |

| | | |
|---|---:|---|
| JP | 8167360 | 6/1996 |
| LU | 67199 | 3/1972 |
| SE | 90308 | 9/1937 |
| SE | 305899 | 11/1968 |
| SE | 255156 | 2/1969 |
| SE | 341428 | 12/1971 |
| SE | 453236 | 1/1982 |
| SE | 457792 | 6/1987 |
| SE | 502417 | 12/1993 |
| SU | 792302 | 1/1971 |
| SU | 425268 | 9/1974 |
| SU | 1019553 | 1/1980 |
| SU | 694939 | 1/1982 |
| SU | 955369 | 8/1983 |
| SU | 1511810 | 5/1987 |
| WO | WO8202617 | 8/1982 |
| WO | 85/02302 | 11/1984 |
| WO | WO8502302 | 5/1985 |
| WO | WO9011389 | 10/1990 |
| WO | WO9012409 | 10/1990 |
| WO | PCT/DE 90/00279 | 11/1990 |
| WO | WO9101059 | 1/1991 |
| WO | WO9101585 | 2/1991 |
| WO | WO9107807 | 3/1991 |
| WO | PCT SE 91/00077 | 4/1991 |
| WO | WO9109442 | 6/1991 |
| WO | WO 91/11841 | 8/1991 |
| WO | WO8115862 | 10/1991 |
| WO | WO 91/15755 | 10/1991 |
| WO | WO9201328 | 1/1992 |
| WO | WO9203870 | 3/1992 |
| WO | WO9321681 | 10/1993 |
| WO | WO9406194 | 3/1994 |
| WO | WO9518058 | 7/1995 |
| WO | WO9522153 | 8/1995 |
| WO | WO9524049 | 9/1995 |
| WO | WO9622606 | 7/1996 |
| WO | WO9622607 | 7/1996 |
| WO | PCT/GN 96/00010 | 10/1996 |
| WO | WO9630144 | 10/1996 |
| WO | WO9710640 | 3/1997 |
| WO | WO9711831 | 4/1997 |
| WO | WO9716881 | 5/1997 |
| WO | WO 97/29494 | 8/1997 |
| WO | WO9745288 | 12/1997 |
| WO | WO9745847 | 12/1997 |
| WO | PCT/FR 98/00468 | 6/1998 |
| WO | WO9834244 | 8/1998 |
| WO | WO9834245 | 8/1998 |
| WO | WO9834246 | 8/1998 |
| WO | WO9834247 | 8/1998 |
| WO | WO9834248 | 8/1998 |
| WO | WO9834249 | 8/1998 |
| WO | WO9834250 | 8/1998 |
| WO | WO9834309 | 8/1998 |
| WO | WO9834312 | 8/1998 |
| WO | WO9834315 | 8/1998 |
| WO | WO9834321 | 8/1998 |
| WO | WO9834322 | 8/1998 |
| WO | WO9834323 | 8/1998 |
| WO | WO9834325 | 8/1998 |
| WO | WO9834326 | 8/1998 |
| WO | WO9834327 | 8/1998 |
| WO | WO9834328 | 8/1998 |
| WO | WO9834329 | 8/1998 |
| WO | WO9834330 | 8/1998 |
| WO | WO9834331 | 8/1998 |
| WO | WO 98/40627 | 9/1998 |
| WO | WO 98/43336 | 10/1998 |
| WO | WO9917309 | 4/1999 |
| WO | WO9917311 | 4/1999 |
| WO | WO9917312 | 4/1999 |
| WO | WO9917313 | 4/1999 |
| WO | WO9917314 | 4/1999 |
| WO | WO9917315 | 4/1999 |
| WO | WO9917316 | 4/1999 |
| WO | WO9917422 | 4/1999 |
| WO | WO9917424 | 4/1999 |
| WO | WO9917425 | 4/1999 |
| WO | WO9917426 | 4/1999 |
| WO | WO9917427 | 4/1999 |
| WO | WO9917428 | 4/1999 |
| WO | WO9917429 | 4/1999 |
| WO | WO9917432 | 4/1999 |
| WO | WO9917433 | 4/1999 |
| WO | WO9919963 | 4/1999 |
| WO | WO9919969 | 4/1999 |
| WO | WO9919970 | 4/1999 |
| WO | PCT/SE 98/02148 | 6/1999 |
| WO | WO9927546 | 6/1999 |
| WO | WO9928919 | 6/1999 |
| WO | WO9928921 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO9929005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO9929024 | 6/1999 |
| WO | WO9929026 | 6/1999 |
| WO | WO9929029 | 6/1999 |
| WO | WO9929034 | 6/1999 |

OTHER PUBLICATIONS

Submersible Motors and Wet–Rotor Motors for Centrifugal Pumps Submerged in the Fluid Handled; K.. Bienick, KSB; pp 9–17.

High Voltage Gernators; G. Beschastnov et al; 1977; vol. 48, No. 6 pp 1–7.

Eine neue Type von Unterwassermotoren; Electrotechnik und Maschinenbam, 49; Aug. 1931; pp 2–3.

Problems in design of the 110–5OokV high–voltage generators; Nikiti et al; World Electrotechnical Congress; Jun. 21–27, 1977; Section 1. Paper #18.

Manufacture and Testing of Roebel bars; P. Marti et al; 1960, Pub.86, vol. 8, pp 25–31.

Hydroalternators of 110 to 220 kV Elektrotechn. Obz., vol. 64, No. 3, pp 32–136 Mar. 1975; A. Abramov.

Design Concepts for an Amorphous Metal Distribution Transformer; E. Boyd et al; IEEE 11/84.

Neue Wege zum Bau zweipoliger Turbogeneratoren bis 2 GVA, 6OkV Elektrotechnik und Maschinenbau Wien Janner 1972, Heft 1, Seite 1–11; G. Aichholzer.

Optimizing designs of water–resistant magnet wire; V. Kuzenev et al; Elektrotekhnika, vol. 59, No. 12, pp 35–40, 1988.

Zur Entwicklung der Tauchpumpenmotoren; A. Schanz; KSB, pp 19–24.

Direct Generation of alternating current at high voltages; R. Parsons; 4/29 IEEE Journal, vol. 67 #393, pp 1065–1080.

Stopfbachslose Unwalzpumpen– ein wichtiges Element im modernen Kraftwerkbau; H. Holz, KSB 1, pp 13–19, 1960.

Zur Geschichte der Brown Boveri–Synchron–Maschnen; Vierzig Jahre Generatorbau; Jan.–Feb. 1931 pp 15–39.

Technik und Anwendung moderner Tauchpumpen; A. Heumann.

High capacity synchronous generator having no tooth stator; V.S. Kildishev et al; No. 1, 1977 pp 11–16.

Der Asynchronmotor als Antrieb stopfbcichsloser Pumpen; E. Picmaus; Eletrotechnik und Maschinenbay No. 78, pp 153–155, 1961.

Low core loss rotating flux transformer; R. F. Krause, et al; Americn Institute Physics J.Appl.Phys vol. 64 #10 Nov. 1988, pp 5376–5378.

An EHV bulk Power transmission line Made with Low Loss XLPE Cable; Ichihara et al.

Underground Transmission Systems Reference Book.

Power System Stability and Control; P. Kundur.

Six phase Synchronous Machine with AC and DC Stator Connections, Part II:Harmonic Studies and a proposed Uninterruptible Power Supply Scheme; R. Schiferl et al.

Six phase Synchronous Machine with AC and DC Stator Connections, Part 1: Equivalent circuit representation and Steady–State Analysis; R. Schiferl et al.

Reactive Power Compensation; T. Petersson.

Different Types of Permanent Magnet Rotors.

Permanent Magnet Machines; K. Binns.

Hochspannungsaniagen for Wechselstrom; 97. Hochspannungsaufgaben an Gereratoren und Motoren; Roth et al; pp 452–455.

Hochspannungsanlagen for Wechselstrom; 97, Hochspannungsaufgaben an Generatoren und Motoren; Roth et al; Spring 1959, pp 30–33.

Neue Lbsungswege zum Entwurf grosser Turbogeneratoren bis 2GVA, 6OKV; G. Aicholzer; Sep. 1974, pp 249–255.

Advanced Turbine–generators—an assessment; A. Appleton, et al; International Conf. Proceedings, Lg HV Elec. Sys. Paris, FR, Aug.–Sep./1976, vol. I, Section 11–02, p. 1–9.

Fully slotless turbogenators; E. Spooner; Proc., IEEE vol. 120 #12, Dec. 1973.

Toroidal winding geometry for high voltage superconducting alternators; J. Kirtley et al; MIT—Elec. Power Sys. Engrg. Lab for IEEE PES 2/74.

High–Voltage Stator Winding Development; D. Albright et al; Proj. Report EL339, Project 1716, Apr. 1984.

Powerformer ™: A giant step in power plant engineering; Owman et al; CIGRE 1998, Paper 11:1.1.

Thin Type DC/DC Converter using a coreless wire transformer; K. Onda et al; Proc. IEEE Power Electronics Spec. Conf. 6/94, pp 330–334.

Development of extruded polymer insulated superconducting cable.

Transformer core losses; B. Richardson; Proc. IEEE May 1986, pp 365–368.

Cloth–transformer with divided windings and tension annealed amorphous wire; T. Yammamoto et al; IEEE Translation Journal on Magnetics in Japan vol. 4, No. 9 Sep. 1989.

A study of equipment sizes and constraints for a unified power flow controller; J Bian et al; IEEE 1996.

A test installation of a sulf–tuned ac filter in the Konti–Skan 2 HDVC link; T. Holmgren,G. Asplund, S. Valdemarsson, P. Hidman of ABB; U. Jonsson of Svenska Kraftnat; O. loof of Vattenfall Vastsverige AB; IEEE Strockholm Power Tech Conference Jun. 1995, pp 64–70.

Analysis of faulted Power Systems; P Anderson, Iowa State University Press / Ames, Iowa, 1973, pp 255–257.

36–Kv. Generators Arise from Insulation Research; P. Sidler; *Electrical World* Oct. 15, 1932, ppp 524.

Oil Water cooled 300MW turbine generator;L.P. Gnedin et al;*Elektrotechnika*, 1970, pp 6–8.

J&P Transformer Book $11^{th}$ Edition;A.C. Franklin et al; owned by Butterworth—Heinemann Ltd, Oxford Printed by Hartnolls Ltd in Great Britain 1983, pp 29–67.

Transformerboard; H.P. Moser et al; 1979, pp 1–19.

The Skagerrak transmission—the world's longest HVDC submarine cable link; L. Hagloff et al of ASEA; ASEA Journal vol. 53, No. 1–2, 1980, pp 3–12.

Direct Connection of Generators to HVDC Converters: Main Characteristics and Comparative Advantage; J.Arrillaga et al; *Electra* No. 149, Aug. 1993, pp 19–37.

Our flexible friend article; M. Judge; *New Scientist,* May 10, 1997, pp 44–48.

In–Service Performance of HVDC Converter transformers and oil–cooled smoothing reactors; G.L. Desilets et al; *Electra* No. 155, Aug. 1994, pp 7–29.

Transformateurs a courant continu haute tension–examen des specifications; A. Lindroth et al; *Electra* No. 141, Apr. 1992, pp 34–39.

Development of a Termination for the 77 kV–Class High Tc Superconducting Power Cable; T. Shimonosono et al; IEEE Power Delivery, vol. 12, No. 1, Jan. 1997, pp 33–38.

Verification of Limiter Performance in Modern Excitation Control Systems; G. K. Girgis et al; IEEE Energy Conservation, vol. 10, No. 3, Sep. 1995, pp 538–542.

A High Initial response Brushless Excitation Systesm; T. L. Dillman et al; IEEE Power Generation Winter Meeting Proceedings, Jan. 31, 1971, pp 2089–2094.

Design manufacturing and cold test of a superconducting coil and its cryostat for SMES applications; A. Bautista et al; IEEE Applied Superconductivity, vol. 7, No. 2, Jun. 1997, pp 853–856.

Quench Protection and Stagnant Normal Zones in a Large Cryostable SMES; Y. Lvovsky et al; IEEE Applied Superconductivity, vol. 7, No. 2, Jun. 1997, pp 857–860.

Design and Construction of the 4 Tesla Background Coil for the Navy SMES Cable Test Apparatus; D.W.Scherbarth et al; IEEE Appliel Superconductivity, vol. 7, No. 2, Jun. 1997, pp 840–843.

High Speed Synchronous Motors Adjustable Speed Drives; ASEA Generation Pamphlet OG 135–101 E, Jan. 1985, pp 1–4.

Billig burk motar overtonen; A. Felldin; *ERA* (TEKNIK) Aug. 1994, pp 26–28.

400–kV XLPE cable system passes CIGRE test; ABB Article; ABB Review Sep. 1995, pp 38.

FREQSYN—a new drive system for high power applications;J–A. Bergman et al; ASEA Journal 59, Apr. 1986, pp 16–19.

Canadians Create Conductive Concrete; J. Beaudoin et al; *Science*, vol. 276, May 23, 1997, pp 1201.

Fully Water–Cooled 190 MVA Generators in the Tonstad Hydroelectric Power Station; E. Ostby et al; BBC Review Aug. 1969, pp 380–385.

Relocatable static var compensators help control unbundled power flows; R. C. Knight et al; *Transmission & Distribution*, Dec. 1996, pp 49–54.

Investigation and Use of Asynchronized Machines in Power Systems*; N.I.Blotskii et al; *Elektrichestvo*, No. 12, 1–6, 1985, pp 90–99.

Variable–speed switched reluctance motors; P.J. Lawrenson et al; IEE proc, vol. 127, Pt.B, No. 4, Jul. 1980, pp 253–265.

Das Einphasenwechselstromsystem hoherer Frequenz; J.G. Heft; Elektrische Bahnen eb; Dec. 1987, pp 388–389.

Power Transmission by Direct Current;E. Uhlmann;ISBN 3–540–07122–9 Springer–Verlag, Berlin/Heidelberg/New York; 1975, pp 327–328.

Elektriska Maskiner; F. Gustavson; Institute for Elkreafteknilk, KTH; Stockholm, 1996, pp 3–6 – 3–12.

Die Wechselstromtechnik; A. Cour' Springer Verlag, Germany; 1936, pp 586–598.

Insulation systems for superconducting transmission cables; O.Toennesen; Nordic Insulation Symposium, Bergen, 1996, pp 425–432.

MPTC: An economical alternative to universal power flow controller;N. Mohan; EPE 1997, Trondheim, pp 3.1027–3.1030.

Lexikon der Technik; Luger; Band 2, Grundlagen der Elektrotechnik und Kerntechnik, 1960, pp 395.

Das Handbuch der Lokomotiven (hungarian locomotive V40 1 'D '); B. Hollingsworth et al; Pawlak Verlagsgesellschaft; 1933, pp. 254–255.

Synchronous machines with single or double 3–phase star–connected winding fed by 12–pulse load commutated inverter. Simulation of operational behaviour; C. Ivarson et al; ICEM 1994, International Conference on electrical machines, vol. 1, pp 267–272.

Elkrafthandbokern, Elmaskiner; A. Rejminger; Elkrafthandboken, Elmaskiner 1996, 15–20.

Power Electronics—in Theory and Practice; K. Thorborg; ISBN 0–86238–341–2, 1993, pp 1–13.

Regulating transformers in power system—new concepts and applications; E. Wirth et al; ABB Review Apr. 1997, p 12– 20.

Tranforming transformers; S. Mehta et al; *IEEE Spectrum*, Jul. 1997, pp. 43–49.

A study of equipment sizes and constraints for a unified power flow controller; J. Bian et al; IEEE Transactions on Power Delivery, vol. 12, No. 3, Jul. 1997, pp. 1385–1391.

Industrial High Voltage; F.H. Kreuger; *Industrial High Voltage* 1991 vol. I, pp. 113–117.

Hochspannungstechnik; A. Küchler; Hochspannungstechnik, VDI Verlag 1996, pp. 365–366, ISBN 3–18–401530–0 or 3–540–62070–2.

High Voltage Engineering; N.S. Naidu; High Voltage Engineering ,second edition 1995 ISBN 0–07–462286–2, Chapter 5, pp 91–98.

Performance Characteristics of a Wide Range Induction Type Frequency Converter; G.A. Ghoneem; Ieema Journal, Sep. 1995, pp 21–34.

International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp 1–65.

Design and manufacture of a large superconducting homopolar motor; A.D. Appleton; IEEE Transactions on Magnetics, vol. 19,No. 3, Part 2, May 1983, pp 1048–1050.

Application of high temperature superconductivy to electric motor design; J.S. Edmonds et al; IEEE Transactions on Energy Conversion Jun. 1992, No. 2, pp 322–329.

Power Electronics and Variable Frequency Drives; B. Bimal; IEEE industrial Electronics—Technology and Applications, 1996, p. 356.

Properties of High Plymer Cement Mortar; M. Tamai et al; *Science & Technology in Japan*, No. 63; 1977, pp 6–14.

Weatherability of Polymer–Modified Mortars after Ten-–Year Outdoor Exposure in Koriyama and Sapporo; Y. Ohama et al; *Science & Technology in Japan No. 63*; 1977, pp 26–31.

SMC Powders Open New Magnetic Applications; M. Persson (Editor); *SMC Update*, vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No. 6, Mar. 15, 1988, p. 1882–1888.

Low–intensy laser–triggering of rail–gaps with magnesium–aerosol switching–gases; W. Frey; 11th International Pulse Power Conference, 1997, Baltimore, USA Digest of Technical Paper, p. 322–327.

* cited by examiner

AXIAL COOLING OF A ROTOR

TECHNICAL FIELD

The present invention relates to large rotating electrical machines equipped with salient pole rotors such as synchronous motors used in industry and synchronous generators used in hydro power plants. The invention relates particularly to a design for controlling the cooling air flow in the rotor by choking the air flow in the air gap and sealing the gaps between adjacent poles.

BACKGROUND ART

Synchronous machines with salient pole rotors are normally cooled with air. Large such machines have radial cooling ducts in the stator. The air is delivered to the stator ducts by first passing axially through the pole gaps in the rotor. In the pole gaps, the air passes axially along the field windings, thereby cooling them. The relatively high peripheral speed of the rotor causes ventilation losses which consist partly of air gap friction losses and partly of a component which is proportional to the mass flow of air.

In order to minimize the ventilation losses it has been suggested in U.S. Pat. No. 3,157,806 that the field winding be water cooled and the pole gaps completely filled with non-magnetic filling compound or enclosed by sealing members. This has the advantage of making the rotor surface smooth and cylindrical which reduces air gap friction. Several hydro generators have been built according to this concept and are described in "Fully water-cooled 190 MVA generators in the Tonstad hydroelectric power station", Brown Boveri Review, (1969) 8, p 380–385. In this concept both the stator and rotor are water-cooled which means that the mass flow of air through the air gap can be minimal, thus reducing ventilation losses even more. However, water cooling is expensive and technically complex, especially in the rotor. For this reason it is advantageous if the rotor is air-cooled while maintaining a cylindrical rotor surface. In U.S. Pat. No. 4,274,027 it is suggested to seal the gaps between adjacent poles but to leave openings at opposite ends of the pole gaps, obviously for axial air cooling of the field windings. However, it is not further described how the machine is cooled. Assuming that the stator is water-cooled, a drawback with this construction is that in the air gap between the stator and the rotor, an air flow will pass that serves no purpose, it only contributes to the ventilation losses.

OBJECT OF THE INVENTION

The object of the invention is to provide air flow control by an air seal placed in the air gap between stator and rotor. The device reduces the mass flow of air that enters axially into the air gap. Used in conjunction with pole gap seals this will reduce the ventilation losses. Advantageous further developments of the invention are indicated in the following description.

SUMMARY OF THE INVENTION

The present invention applies to a machine with a stator without radial ventilation ducts, e.g. water-cooled, and air-cooled rotor in which the pole gaps of the rotor are covered, thereby also blocking the entrance to the air gap on the fan side so that a larger amount of air from a rotor fan supplying the air gap of the rotor, is blown into the pole gaps. This means that a lower flow volume is required than if the air is divided into one air flow through the air gap and one air flow through the pole gaps.

BRIEF DESCRIPTION OF THE DRAWINGS

The invention will be described in more detail in the following with reference to the accompanying drawings in which.

DESCRIPTION OF THE INVENTION

Figures 1, 2, 3:
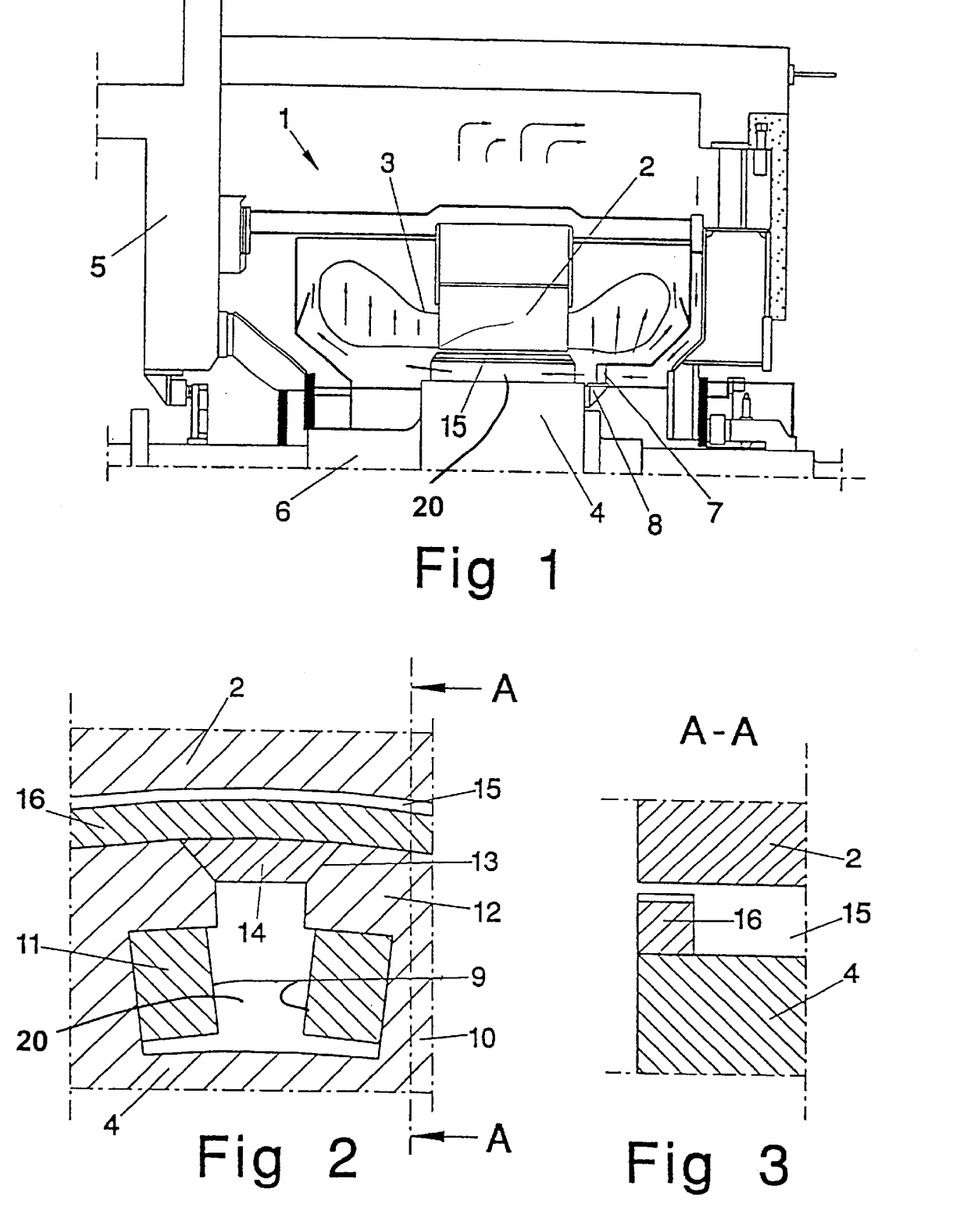
FIG. 1 shows a schematic axial section through a rotating electric machine with a one-way air-cooled rotor in accordance with the present invention.
FIG. 2 shows a partial radial section through a rotor provided with a device in accordance with the present invention.
FIG. 3 shows a partial axial section along the line A—A through a rotor pole according to FIG. 2.

FIG. 1 shows a rotating electric machine 1 comprising a stator 2 with stator winding 3 which may consist of high-voltage cable. The machine 1 is provided with a rotor 4 arranged on a machine shaft 6 journalled in a machine housing 5. The rotor 4 is also provided with a fan 8 having blades 7. A controlled air flow for axial rotor cooling is indicated by arrows in the Figure. This also shows how the coil end parts of the machine are allowed to be cooled by the air flow. However, the invention is not limited to the embodiment shown in the drawing and according to a different embodiment the coil end parts can be cooled separately to avoid cooling one coil end with heated air. This can also be achieved by two-way axial cooling where each end of the rotor is provided with a fan blowing in air towards the middle of the rotor, the air then leaving through a radial air duct situated in the middle of the stator.

FIG. 2 shows a partial radial section through the rotor 4 which has salient pole gaps 9 between each rotor pole 10. A field winding 11 is arranged around the rotor poles. A pole shoe 12 is arranged outermost on each rotor pole 10. The pole shoe 12 is provided along both sites with a bevelled edge surface 13. A cover member 14 is applied in the outer of the pole gap 9, which seals between the adjacent edge surfaces of two pole shoes. In the embodiment with one-way cooling the cover member 14, which may be of metallic material or of plastic, is glued or screwed to the edge surfaces along the entire axial length of the rotor. In the embodiment with two-way cooling, on the other hand the cover member is divided or perforated at the axial center of the rotor so that the air can be deflected from its visual direction to a radial an out though an air duct 20 in the stator. As can also be seen in FIG. 1 an air gap 15 exists by rotor 4 and stator 2.

In small machines cooled only by air, this air gap is used to blow air through for cooling both rotor and stator. In large machines, as in the present case with water-cooled stator, this is an uneconomical cooling method and the air flow through the air gap should therefore be as small as possible, enabling it to be used where it is better needed—in the present case to flow through the pole gaps and possibly also to cool the coil end parts at the same time.

According to FIG. 3 at least one sealing ring 16 is permanently arranged on the periphery of the rotor 4 in order to minimize or avoid air flow in the gap 15. As is also clear from FIG. 3, the sealing ring 16 is placed on one side of the rotor 4, in the present case on the air-inlet side of the machine. This prevents air from flowing into the air gap 15 between rotor 4 and stator 2.

Another advantageous embodiment of the present invention is, in corresponding manner, to provide the stator with a permanently arranged sealing ring in the air gap between stator and rotor.

The invention is not limited to the embodiments shown. Several modifications are feasible within the scope of the invention. The sealing ring, for instance, can be fitted in any axial position whatsoever on rotor or stator. Further, several sealing rings can be fitted either on the rotor or the stator. A number of sealing rings may also be fitted on the rotor and a number on the stator, to cooperate as a labyrinth seal in order to minimize the air flow between rotor and stator.

What is claimed is:

1. An air flow control for reducing ventilation losses in a rotating electric machine formed with a stator having a central opening and a rotor mounted for rotation within the central opening and having end portions, said rotor and stator having an air gap therebetween, the stator includes stator windings, and the rotor includes field windings, and salient poles in the air gap facing the stator and pole shoes disposed in spaced relation and having adjacent lateral margins forming pole gaps between the pole shoes and a cover member disposed between the pole shoes extending between the adjacent lateral margins for covering each of the pole gaps between the pole shoes forming an axial channel having openings at the ends for carrying a flow of cooling air therethrough and sealing means in the air gap for limiting the flow of air in the air gap.

2. The machine as claimed in claim 1, wherein the sealing means comprises at least one fixed sealing ring arranged around the rotor in the air gap between the stator and the rotor.

3. The machine as claimed in claim 2, wherein the machine has an air-inlet side and the sealing ring is located on the air-inlet side of the machine.

4. The machine as claimed in claim 1, wherein the sealing means comprises at least one internally fixed sealing ring arranged around the stator in the air gap between the stator and the rotor.

5. The machine as claimed in claim 1, further including a fan secured to the rotor for producing the flow of air.

6. The machine as claimed in claim 1, wherein the cover member has an opening near an axial center of the rotor so that the air can be deflected from an axial direction to a radial direction out through an air duct in the stator.

7. The machine according to claim 1, wherein the stator winding comprises a high-voltage cable.

8. The machine according to claim 1, wherein the sealing means comprises an air choker to limit the flow of air through the pole gaps.

\* \* \* \* \*